United States Patent
Fumoto et al.

(10) Patent No.: US 11,353,267 B2
(45) Date of Patent: Jun. 7, 2022

(54) HEAT EXCHANGER

(71) Applicant: NGK INSULATORS, LTD., Nagoya (JP)

(72) Inventors: Yutaro Fumoto, Kasugai (JP); Tatsuo Kawaguchi, Mizuho (JP)

(73) Assignee: NGK Insulators, Ltd., Nagoya (JP)

( * ) Notice: Subject to any disclaimer, the term of this patent is extended or adjusted under 35 U.S.C. 154(b) by 117 days.

(21) Appl. No.: 16/898,745

(22) Filed: Jun. 11, 2020

(65) Prior Publication Data

US 2021/0080187 A1 Mar. 18, 2021

(30) Foreign Application Priority Data

Sep. 12, 2019 (JP) .............................. JP2019-166657

(51) Int. Cl.
| F28D 7/10 | (2006.01) |
| F28D 7/16 | (2006.01) |
| F28F 1/02 | (2006.01) |
| F28F 27/00 | (2006.01) |
| F28D 21/00 | (2006.01) |

(52) U.S. Cl.
CPC ............ *F28D 7/1692* (2013.01); *F28D 7/10* (2013.01); *F28D 7/103* (2013.01); *F28D 21/0003* (2013.01); *F28F 1/022* (2013.01); *F28F 27/00* (2013.01); *F01N 2240/02* (2013.01)

(58) Field of Classification Search
CPC .... F01N 5/02; F01N 2240/02; F28D 21/0003; F28D 7/10; F28D 7/103; F28F 27/02; F28F 2250/06; F28F 7/02
See application file for complete search history.

(56) References Cited

U.S. PATENT DOCUMENTS

| 8,424,296 B2 | 4/2013 | Burgers et al. |
| 2010/0146954 A1* | 6/2010 | Sloss .................. F02D 9/04 60/320 |

(Continued)

FOREIGN PATENT DOCUMENTS

| CN | 108026817 A | 5/2018 |
| DE | 11 2012 001 057 T5 | 11/2013 |

(Continued)

OTHER PUBLICATIONS

German Office Action (Application No. 10 2020 208 061.5) dated Sep. 24, 2021 (with English translation).

(Continued)

*Primary Examiner* — Eric S Ruppert
(74) *Attorney, Agent, or Firm* — Burr & Brown, PLLC

(57) ABSTRACT

A heat exchanger includes: a hollow pillar shaped honeycomb structure, a first cylindrical member, a second cylindrical member, a cylindrical guide member, and an upstream cylindrical member. A communication port is provided between the downstream end portion of the guide member and the second cylindrical member or at the guide member. The second cylindrical member has a horn shape in which a diameter of the upstream end portion of the second cylindrical member is increased radially outward. The upstream cylindrical member has a flange portion, and a rising position of the flange portion is located on a more downstream side than the upstream end portion of the first cylindrical member.

20 Claims, 4 Drawing Sheets

(56) References Cited

U.S. PATENT DOCUMENTS

| | | | |
|---|---|---|---|
| 2011/0302910 A1* | 12/2011 | Burgers | F28D 7/103 |
| | | | 60/299 |
| 2012/0222845 A1 | 9/2012 | Kinder et al. | |
| 2014/0299115 A1 | 10/2014 | Zhang et al. | |
| 2017/0268401 A1* | 9/2017 | Okami | F02G 5/02 |
| 2018/0230884 A1 | 8/2018 | Kawaguchi et al. | |
| 2018/0258808 A1 | 9/2018 | Asai et al. | |

FOREIGN PATENT DOCUMENTS

| | | | |
|---|---|---|---|
| DE | 102012210456 A1 * | 12/2013 | ............ F01N 1/165 |
| DE | 11 2016 004 829 T5 | 7/2018 | |
| EP | 2 851 548 A1 | 3/2015 | |
| JP | 2012-037165 A1 | 2/2012 | |
| JP | 2018-119418 A1 | 8/2018 | |
| WO | WO-2017069265 A1 * | 4/2017 | ............... F01N 5/02 |

OTHER PUBLICATIONS

Chinese Office Action (with English translation), Chinese Application No. 202010521680.7, dated Dec. 31, 2021 (10 pages).

* cited by examiner

200

200

300

400

500

HEAT EXCHANGER

FIELD OF THE INVENTION

The present invention relates to a heat exchanger.

BACKGROUND OF THE INVENTION

Recently, there is a need for improvement of fuel economy of motor vehicles. In particular, a system is expected that worms up a coolant, engine oil and an automatic transmission fluid (ATF: Automatic Transmission Fluid) at an early stage to reduce friction losses, in order to prevent deterioration of fuel economy at the time when an engine is cold, such as when the engine is started. Further, a system is expected that heats an exhaust gas purifying catalyst in order to activate the catalyst at an early stage.

A such systems, for example, there is a heat exchanger. The heat exchanger is a device that exchanges heat between a first fluid and a second fluid by allowing the first fluid to flow inside and the second fluid to flow outside. In such a heat exchanger, for example, the heat can be effectively utilized by exchanging the heat from the first fluid having a higher temperature (for example, an exhaust gas) to the second fluid having a lower temperature (for example, cooling water).

Patent Document 1 proposes a heat exchanger including: a heat collecting portion formed as a honeycomb structure having a plurality of cells through which a first fluid (for example, an exhaust gas) can flow; and a casing arranged to cover an outer peripheral surface of the heat collecting portion, through which a second fluid (for example, cooling water) can flow between the heat collecting portion and the casing.

However, the heat exchanger of Patent Literature 1 has a structure in which waste heat from the first fluid to the second fluid is constantly collected. Therefore, even if there is no need to collect the waste heat (even if the heat exchange is not needed), the waste heat might be collected. Therefore, the heat exchanger has been required to increase a capacity of a radiator for discharging the collected waste heat even if there has been no need to collect the waste heat.

On the other hand, Patent Literature 2 proposes a heat exchanger (an exhaust heat recovery device) including: an inner pipe for allowing an exhaust gas from an engine to flow to a rear side of a vehicle; an outer pipe disposed on an outer peripheral portion of the inner pipe in an axial direction of the inner pipe, the outer pipe extending to a more rear side of the vehicle than a rear end of the inner pipe; a valve for opening and closing the rear end of the inner pipe; a first restricting portion having an inflow port that opens toward the rear side of the vehicle with respect to an interior of the inner pipe, the first restricting portion allowing the exhaust gas flowing from the interior of the inner pipe through the inflow port to flow toward a front side of the vehicle, and guiding the exhaust gas to a radially outward side of the inner pipe through a hole formed in the inner pipe; a flow path formed between the inner pipe and the outer pipe, the flow path allowing the exhaust gas guided to the radially outward side of the inner pipe through the hole to flow toward the rear side of the vehicle on a radially outward side of the inner pipe; a heat exchange portion disposed radially outside the inner pipe, the heat exchanging portion exchanging heat between the exhaust gas flowing through the flow path and a refrigerant; and a second restricting provided on a more downstream side than the heat exchange portion in a flow direction in the flow path.

The heat exchanger of Patent Literature 2 can perform switching between promotion and suppression of heat recovery (heat exchange) by opening and closing the valve. In particular, the heat exchanger is provided with the first restricting portion and the second restricting portion, so that heat insulation performance can be improved as a result of difficulty for the exhaust gas to flow in the heat exchanger portion by opening the rear end of the inner pipe (opening the valve) during the suppression of heat recovery.

CITATION LIST

Patent Literatures
[Patent Literature 1] Japanese Patent Application Publication No. 2012-037165 A
[Patent Literature 2] Japanese Patent Application Publication No. 2018-119418 A

SUMMARY OF THE INVENTION

The present invention relates to a heat exchanger, comprising: a hollow pillar shaped honeycomb structure having an inner peripheral wall, an outer peripheral wall and a partition wall disposed between the inner peripheral wall and the outer peripheral wall, the partition wall defining a plurality of cells, each of the cells extending from a first end face to a second end face to form a flow path for a first fluid;
a first cylindrical member fitted to the outer peripheral wall of the pillar shaped honeycomb structure;
a second cylindrical member fitted to the inner peripheral wall of the pillar shaped honeycomb structure;
a cylindrical guide member having a portion arranged on a radially inner side of the second cylindrical member with a distance so as to form a flow path for the first fluid; and
an upstream cylindrical member connecting an upstream end portion of the first cylindrical member to an upstream side of the guide member,
wherein a communication port for guiding the first fluid flowing on an inner peripheral surface side of the guide member to a space between an inner peripheral surface side of the second cylindrical member and an outer peripheral surface side of the guide member is provided between the downstream end portion of the guide member and the second cylindrical member or at the guide member,
wherein the second cylindrical member has a horn shape in which a diameter of the upstream end portion of the second cylindrical member is increased radially outward, and
wherein the upstream cylindrical member has a flange portion, and a rising position of the flange portion is located on a more downstream side than the upstream end portion of the first cylindrical member.

Also, the present invention relates to a heat exchanger, comprising:
a hollow pillar shaped honeycomb structure having an inner peripheral wall, an outer peripheral wall and a partition wall disposed between the inner peripheral wall and the outer peripheral wall, the partition wall defining a plurality of cells, each of the cells extending from a first end face to a second end face to form a flow path for a first fluid;
a first cylindrical member fitted to the outer peripheral wall of the pillar shaped honeycomb structure;
a second cylindrical member fitted to the inner peripheral wall of the pillar shaped honeycomb structure;
a cylindrical guide member having a portion arranged on a radially inner side of the second cylindrical member with a distance so as to form a flow path for the first fluid;

an upstream cylindrical member connecting an upstream end portion of the first cylindrical member to an upstream side of the guide member; and a cylindrical flow-regulating guide member connected to the upstream end portion of the second cylindrical member, wherein a communication port for guiding the first fluid flowing on an inner peripheral surface side of the guide member to a space between an inner peripheral surface side of the second cylindrical member and an outer peripheral surface side of the guide member is provided between the downstream end portion of the guide member and the second cylindrical member or at the guide member, wherein the upstream cylindrical member has a flange portion, and a rising position of the flange portion is located on a more downstream side than the upstream end portion of the first cylindrical member, and wherein the cylindrical flow-regulating guide member has a horn shape in which a diameter of an upstream end portion of the flow-regulating guide member is increased radially outward.

DETAILED DESCRIPTION OF THE INVENTION

As a result of studies, the present inventors have found that the danger of Patent Literature 2 is provided with the first restricting portion and the second restricting portion and thus causes a problem that when the rear end of the inner pipe is closed (when the valve is closed) during the heat recovery, it is difficult for the exhaust gas to flow from the inner pipe to the heat exchange portion, resulting in decreased heat recovery performance and leading to an easy increase in pressure loss.

The present invention has been made to solve the above problems. An object of the present invention is to provide a heat exchanger which can suppress an increase in pressure loss during heat recovery to improve heat recovery performance.

As results of intensive studies of a structure of a heat exchanger, the present inventors have found that a heat exchanger having a specific structure can solve the above problems, and have completed the present invention.

According to the present invention, it is possible to provide a heat exchanger which can suppress an increase in pressure loss during heat recovery to improve heat recovery performance.

Hereinafter, embodiments of the present invention will be specifically described with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention.

Embodiment 1

A heat exchanger according to Embodiment 1 of the present invention includes: a hollow pillar shaped honeycomb structure (which may, hereinafter, be abbreviated as a "pillar shaped honeycomb structure"); a first cylindrical member; a second cylindrical member; a guide member; and an upstream cylindrical member. The heat exchanger may further include at least one of a downstream cylindrical member, an outer cylindrical member, and an on-off valve.

Figure 1:
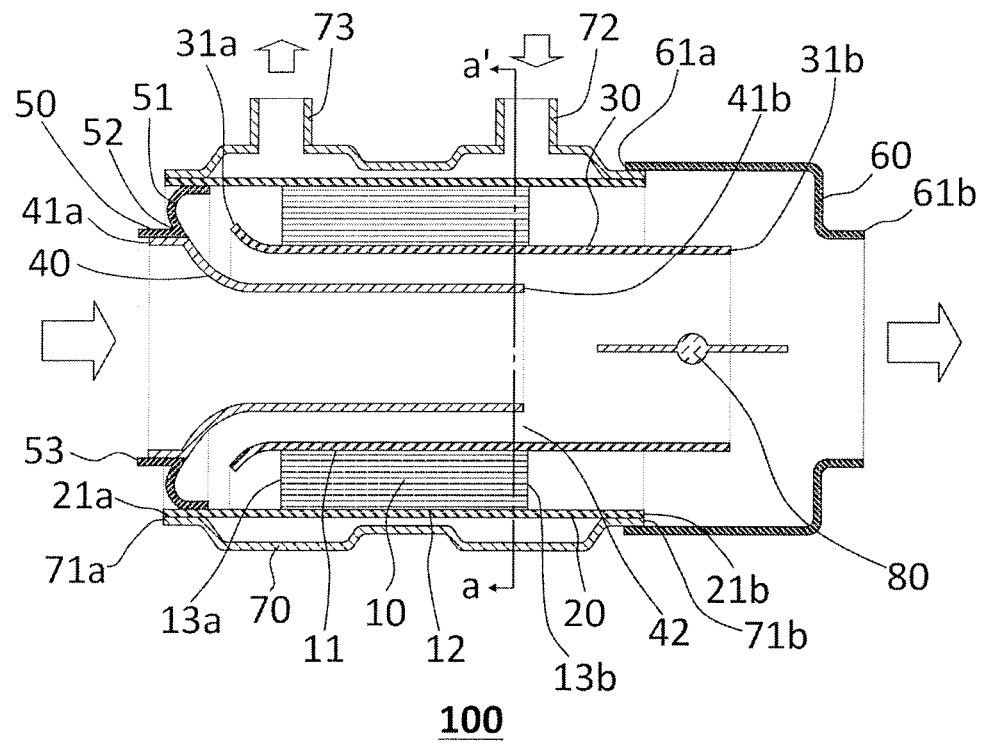
FIG. 1 is a cross-sectional view of a heat exchanger according to Embodiment 1 of the present invention, which is parallel to a flow direction of a first fluid.
Figure 2:
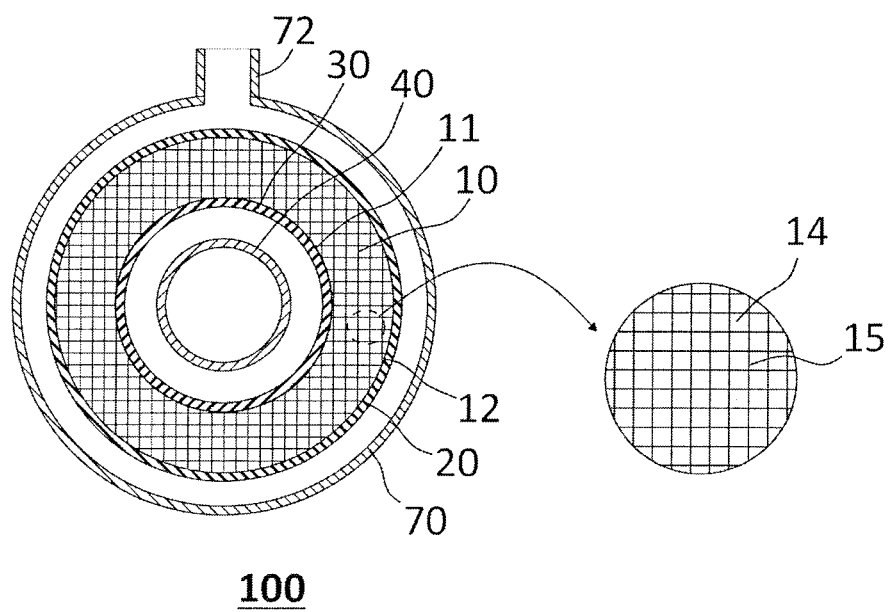
FIG. 2 is a cross-sectional view taken along the line a-a' in the heat exchanger of FIG. 1.

FIG. 1 is a cross-sectional view of a heat exchanger according to Embodiment 1 of the present invention, which is parallel to a flow direction of a first fluid. FIG. 2 is a cross-sectional view taken along the line a-a' in the heat exchanger of FIG. 1.

As shown in FIGS. 1 and 2, a heat exchanger 100 according to an embodiment of the present invention includes: a hollow pillar shaped honeycomb structure 10 (which may, hereinafter, be abbreviated as a "pillar shaped honeycomb structure"); a first cylindrical member 20; a second cylindrical member 30; a guide member 40; an upstream cylindrical member 50; a downstream cylindrical member 60; an outer cylindrical member 70; and an on-off valve 80.

<Hollow Pillar Shaped Honeycomb Structure 10>

The hollow pillar shaped honeycomb structure 10 includes an inner peripheral wall 11, an outer peripheral wall 12, and partition wall 15 which are disposed between the inner peripheral wall 11 and the outer peripheral wall 12, and which define a plurality of cells 14 extending from a first end face 13a to a second end face 13b to form flow paths for a first fluid.

As used herein, the "hollow pillar shaped honeycomb structure 10" refers to a pillar shaped honeycomb structure 10 having a hollow region at a central portion in a cross section of the hollow pillar shaped honeycomb structure 10, which is perpendicular to a flow direction of the first fluid.

A shape (outer shape) of the hollow pillar shaped honeycomb structure 10 is not particularly limited, and it may be, for example, a circular pillar shape, an elliptical pillar shape, a quadrangular pillar shape, or other polygonal pillar shape.

Also, a shape of the hollow region in the hollow pillar shaped honeycomb structure 10 is not particularly limited, and it may be, for example, a circular pillar shape, an elliptical pillar shape, a quadrangular pillar shape, or other polygonal pillar shape.

It should be note that the shape of the hollow pillar shaped honeycomb structure 10 and the shape of the hollow region may be the same as or different from each other. However, they are preferably the same as each other, in terms of resistance to external impact, thermal stress, and the like.

Each cell 14 may have any shape, including, but not particularly limited to, circular, elliptical, triangular, quadrangular, hexagonal and other polygonal shapes in a cross section in a direction perpendicular to a flow path direction of the first fluid. Also, the cells 14 are radially provided in a cross section in a direction perpendicular to the flow path direction of the first fluid. Such a structure can allow heat of the first fluid flowing through the cells 14 to be efficiently transmitted to the outside of the hollow pillar shaped honeycomb structure 10.

A thickness of a partition wall 15 may preferably be from 0.1 to 1 mm, and more preferably from 0.2 to 0.6 mm, although not particularly limited thereto. The thickness of the partition wall 15 of 0.1 mm or more can provide the hollow pillar shaped honeycomb structure 10 with a sufficient mechanical strength. Further, the thickness of the partition wall 5 of 1.0 mm or less can suppress problems that the pressure loss is increased due to a decrease in an opening area and the heat recovery efficiency is decreased due to a decrease in a contact area with the first fluid.

Each of the inner peripheral wall 11 and the outer peripheral wall 12 preferably has a thickness larger than that of the partition wall 15, although not particularly limited thereto. Such a structure can lead to increased strength of the inner peripheral wall 11 and the outer peripheral wall 12 which would otherwise tend to generate breakage (e.g., cracking, chinking, and the like) by external impact, thermal stress due to a temperature difference between the first fluid and the second fluid, and the like.

In addition, the thicknesses of the inner peripheral wall 11 and the outer peripheral wall 12 are not particularly limited, and they may be adjusted as needed according to applications and the like. For example, the thickness of each of the inner peripheral wall 11 and the outer peripheral wall 12 is preferably 0.3 mm or more and 10 mm or less, and more preferably from 0.5 mm to 5 mm, and even more preferably from 1 mm to 3 mm, when using the heat exchange 100 for general heat exchange applications. Moreover, when using the heat exchanger 100 for heat storage applications, the thickness of the outer peripheral wall 12 is preferably 10 mm or more, in order to increase a heat capacity of the outer peripheral wall 12.

The partition wall 15, the inner peripheral wall 11 and the outer peripheral wall 12 preferably contain ceramics as a main component. The phrase "contain ceramics as a main component" means that a ratio of a mass of ceramics to the masses of the total components is 50% by mass or more.

The partition wall 15, the inner peripheral wall 11 and the outer peripheral wall 12 preferably has a porosity of 10% or less, and more preferably 5% or less, and even more preferably 3% or less, although not particularly limited thereto. Further, the porosity of the partition wall 15, the inner peripheral wall 11 and the outer peripheral wall 12 may be 0%. The porosity of the partition wall 15, the inner peripheral wall 11 and the outer peripheral wall 12 of 10% or less can lead to improvement of thermal conductivity.

The partition wall 15, the inner peripheral wall 11 and the outer peripheral wall 12 preferably contain SiC (silicon carbide) having high thermal conductivity as a main component. Examples of such a material includes Si-impregnated SiC, (Si+Al) impregnated SiC, a metal composite SiC, recrystallized SiC, $Si_3N_4$, SiC, and the like. Among them, Si-impregnated SiC and (Si+Al) impregnated SiC are preferably used because they can allow production at lower cost and have high thermal conductivity.

A cell density (that is, the number of cells 14 per unit area) in the cross section of the hollow pillar shaped honeycomb structure 10 perpendicular to the flow path direction of the first fluid is preferably in a range of from 4 to 320 cells/$cm^2$, although not particularly limited thereto. The cell density of 4 cells/$cm^2$ or more can sufficiently ensure the strength of the partition wall 15, hence the strength of the hollow pillar shaped honeycomb structure 10 itself and effective GSA (geometrical surface area). Further, the cell density of 320 cells/$cm^2$ or less can allow prevention of an increase in a pressure loss when the first fluid flows.

The hollow pillar shaped honeycomb structure 10 preferably has an isostatic strength of more than 100 MPa, and more preferably 150 MPa or more, and still more preferably 200 MPa or more, although not particularly limited thereto. The isostatic strength of the hollow pillar shaped honeycomb structure 10 of 100 MPa or more can lead to the hollow pillar shaped honeycomb structure 10 having improved durability. The isostatic strength of the hollow pillar shaped honeycomb structure 10 can be measured according to the method for measuring isostatic fracture strength as defied in the JASO standard M505-87 which is a motor vehicle standard issued by Society of Automotive Engineers of Japan, Inc.

A diameter (an outer diameter) of the outer peripheral wall 12 in the cross section in direction perpendicular to the flow path direction of the first fluid may preferably be from 20 to 200 mm, and more preferably from 30 to 100 mm, although not particularly limited thereto. Such a diameter can allow improvement of heat recovery efficiency. When the shape of the outer peripheral wall 12 is not circular, the diameter of the largest inscribed circle that is inscribed in the cross-sectional shape of the outer peripheral wall 12 is defined as the diameter of the outer peripheral wall 12.

Further, a diameter of the inner peripheral wall 11 in the cross section in the direction perpendicular to the flow path direction of the first fluid may preferably be from 1 to 50 mm, and more preferably from 2 to 30 mm, although not particularly limited thereto. When the cross-sectional shape of the inner peripheral wall 11 is not circular, the diameter of the largest inscribed circle that is inscribed in the cross-sectional shape of the inner peripheral wall 11 is defined as the diameter of the inner peripheral wall 11.

The hollow pillar shaped honeycomb structure 10 preferably has a thermal conductivity of 50 W/(m·K) or more at 25° C., and more preferably from 100 to 300 W/(m·K), and even more preferably from 120 to 300 W/(m K), although not particularly limited thereto. The thermal conductivity of the hollow pillar shaped honeycomb structure 10 in such a range can lead to an improved thermal conductivity and can allow the heat inside the hollow pillar shaped honeycomb structure 10 to be efficiently transmitted to the outside. It should be noted that the value of thermal conductivity is a value measured according to the laser flash method (JIS R 1611-1997).

In the case where an exhaust gas as the first fluid flows through the cells 14 in the hollow pillar shaped honeycomb structure 10, a catalyst may be supported on the partition wall 15 of the pillar shaped honeycomb structure 10. The supporting of the catalyst on the partition wall 15 can allow CO, NOx, HC and the like in the exhaust gas to be converted into harmless substances through catalytic reaction, and can also allow reaction heat generated during the catalytic reaction to be utilized for heat exchange. Preferable catalysts include those containing at least one element selected from the group consisting of noble metals (platinum, rhodium, palladium, ruthenium, indium, silver and gold), aluminum, nickel, zirconium, titanium, cerium, cobalt, manganese, zinc, copper, tin, iron, niobium, magnesium, lanthanum, samarium, bismuth, and barium. Any of the above-listed elements may be contained as a metal simple substance, a metal oxide, or other metal compound.

A supported amount of the catalyst (catalyst metal+ support) may preferably be from 10 to 400 g/L, although not particularly limited thereto. Further, when using the catalyst containing the noble metal(s), the supported amount may preferably be from 0.1 to 5 g/L, although not particularly limited thereto. The supported amount of the catalyst (catalyst metal+support) of 10 g/L or more can easily achieve catalysis. Also, the supported amount of the catalyst (catalyst metal+support) of 400 g/L or less can allow suppression of both an increase in a pressure loss and an increase in a manufacturing cost. The support refers to a carrier on which a catalyst metal is supported. Examples of the supports include those containing at least one selected from the group consisting of alumina, ceria and zirconia.

<First Cylindrical Member 20>

The first cylindrical member 20 is fitted to the outer peripheral wall 12 of the pillar shaped honeycomb structure 10.

The first cylindrical member 20 is a tubular member having an upstream end portion 21a and a downstream end portion 21b.

It is preferable that an axial direction of the first cylindrical member 20 coincides with that of the pillar shaped honeycomb structure 10, and a central axis of the first cylindrical member 20 coincides with that of the pillar shaped honeycomb structure 10. It is also preferable that a central position of the first cylindrical member 20 in an axial direction coincides with that of the pillar shaped honeycomb structure 10 in the axial direction. Further, diameters (an outer diameter and an inner diameter) of the first cylindrical member 20 may be uniform in the axial direction, but the diameter of at least a part (for example, both ends in the axial direction or the like) of the first outer cylinder may be increased or decreased.

Non-limiting examples of the first cylindrical member 20 that can be used include a cylindrical member fitted to the outer peripheral wall 12 of the hollow pillar shaped honeycomb structure 10 to cover circumferentially the outer peripheral wall 12 of the hollow pillar shaped honeycomb structure 10.

As used herein, the "fitted" means that the hollow pillar shaped honeycomb structure 10 and the first cylindrical member 20 are fixed in a state of being suited to each other. Therefore, the fitting of the hollow pillar shaped honeycomb structure 10 and the first cylindrical member 20 encompasses cases where the hollow pillar shaped honeycomb structure 10 and the first cylindrical member 20 are fixed to each other by a fixing method based on fitting such as clearance fitting, interference fitting and shrinkage fitting, as well as by brazing, welding, diffusion bonding, or the like.

The first cylindrical member 20 may preferably have an inner surface shape corresponding to the outer peripheral wall 12 of the hollow pillar shaped honeycomb structure 10. Since the inner surface of the first cylindrical member 20 is in direct contact with the outer peripheral wall 12 of the hollow pillar shaped honeycomb structure 10, the thermal conductivity is improved and the heat in the hollow pillar shaped honeycomb structure 10 can be efficiently transferred to the first cylindrical member 20.

In terms of improvement of the heat recovery efficiency, a higher ratio of an area of a portion circumferentially covered with the first cylindrical member 20 in the outer peripheral wall 12 of the hollow pillar shaped honeycomb structure 10 to the total area of the outer peripheral wall 12 of the hollow pillar shaped honeycomb structure 10 is preferable. Specifically, the area ratio is preferably 80% or more, and more preferably 90% or more, and even more preferably 100% (that is, the entire outer peripheral wall 12 of the hollow pillar shaped honeycomb structure 10 is circumferentially covered with the first cylindrical member 20).

It should be noted that the term "outer peripheral wall 12" as used herein refers to a surface of the pillar shaped honeycomb structure 10, which is parallel to the flow path direction of the first fluid, and does not include surfaces (the first end face 13a and the second end face 13b) of the pillar shaped honeycomb structure 10, which are perpendicular to the flow path direction of the first fluid.

The first cylindrical member 20 is preferably made of a metal in terms of manufacturability, although not particularly limited thereto. Further, the metallic first cylindrical member 20 is also preferable in that it can be easily welded to an outer cylindrical member 70 that will be described below. Examples of the material of the first cylindrical member 20 that can be used include stainless steel, titanium alloys, copper alloys, aluminum alloys, brass and the like. Among them, the stainless steel is preferable because it has high durability and reliability and is inexpensive.

The first cylindrical member 20 preferably has a thickness of 0.1 mm or more, and more preferably 0.3 mm or more, and still more preferably 0.5 mm or more, although not particularly limited thereto. The thickness of the first cylindrical member 20 of 0.1 mm or more can ensure durability and reliability. The thickness of the first cylindrical member 20 is preferably 10 mm or less, and more preferably 5 mm or less, and still more preferably 3 mm or less. The thickness of the first cylindrical member 20 of 10 mm or less can reduce thermal resistance and improve thermal conductivity.

<Second Cylindrical Member 30>

The second cylindrical member 30 is fitted to the inner peripheral wall 11 of the pillar shaped honeycomb structure 10.

The second cylindrical member 30 is a tubular member having an upstream end portion 31a and a downstream end portion 31b.

The second cylindrical member 30 has a horn shape in which a diameter of the upstream end portion 31a is increased radially outward.

Figure 3:
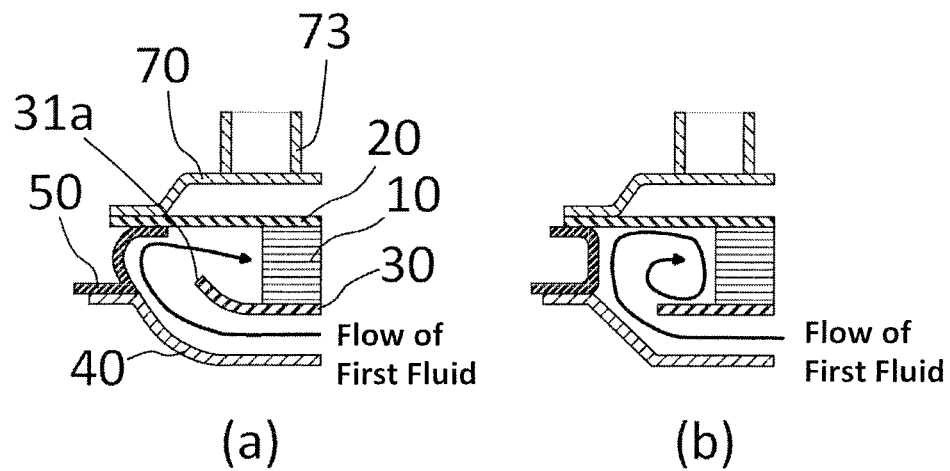
FIG. 3 is a cross-sectional view of a heat exchanger around an upstream end portion of a second cylindrical member, which is parallel to a flow direction of a first fluid.

Here, FIG. 3(a) shows a partially enlarged cross-sectional view around the upstream end portion 31a of the second cylindrical member 30. As shown in FIG. 3(a), the formation of the upstream end portion 31a of the second cylindrical member 30 into the horn shape can provide smooth flowing of the first fluid passing between the second cylindrical member 30 and the guide member 40 and entering the pillar shaped honeycomb structure 10 during heat recovery, so that pressure loss can be reduced. On the other hand, as shown in FIG. 3(b), when the upstream end portion 31a of the second cylindrical member 30 does not have the horn shape, a vortex flow of the first fluid is generated in a region before the first fluid enters the pillar shaped honeycomb structure 10 (a region surrounded by the first end face 13a of the pillar shaped honeycomb structure 10, the first cylindrical member 20, and the second cylindrical member 30), and as a result, the pressure in the region will be increased and the first fluid will be difficult to enter the pillar shaped honeycomb structure 10.

It is preferable that an axial direction of the second cylindrical member 30 coincides with that of the pillar shaped honeycomb structure 10, and a central axis of the second cylindrical member 30 coincides with that of the pillar shaped honeycomb structure 10. Further, it is also preferable that an axial center position of the second cylindrical member 30 coincides with that of the pillar shaped honeycomb structure 10.

Non-limiting examples of the second cylindrical member 30 that can be used herein includes a cylindrical member in which a part of the outer peripheral surface of the second cylindrical member 30 is in contact with the inner peripheral wall 11 of the hollow pillar shaped honeycomb structure 10.

Here, a part of the outer peripheral surface of the second cylindrical member 30 and the inner peripheral wall 11 of the pillar shaped honeycomb structure 10 may be in direct contact with each other or indirect contact with each other via another member.

The part of the outer peripheral surface of the second cylindrical member 30 and the inner peripheral wall 11 of the pillar shaped honeycomb structure 10 are fixed to each other in a state where they are fitted to each other. A fixing method is not particularly limited, and it may the same as that of the first cylindrical member 20 as described above.

A material of the second cylindrical member 30 is not particularly limited and may be the same as that of the first cylindrical member 20 as described above.

A thickness of the second cylindrical member 30 is not particularly limited and may be the same as that of the first cylindrical member 20 as described above.

<Guide Member 40>

The guide member 40 has a portion arranged on a radially inner side of the second cylindrical member 30 with a distance so as to form a flow path for the first fluid.

The guide member 40 is a tubular member having an upstream end portion 41a and a downstream end portion 41b.

It is preferable that an axial direction of the guide member 40 coincides with that of the pillar shaped honeycomb structure 10, and a central axis of the guide member 40 coincides with that of the pillar shaped honeycomb structure 10.

For example, as the guide member 40, it is possible to use a cylindrical member having an outer diameter smaller than an inner diameter of the second cylindrical member 30, in a cross section perpendicular to the axial direction of the guide member 40 and the second cylindrical member 30. Such a structure can prevent the second cylindrical member 30 and the guide member 40 from coming into contact with each other, so that the flow path for the first fluid formed between the guide member 40 and the second cylindrical member 30 can be ensured.

Across-sectional area between the second cylindrical member 30 and the guide member 40 in the direction perpendicular to the axial direction of the guide member 40 and the second cylindrical member 30 (a direction perpendicular to the axial direction of the flow path for the first fluid) is such that a ratio of the cross-sectional area between the second cylindrical member 30 and the guide member 40 to a cross-sectional area at an upstream end portion 53 of an upstream cylindrical member 50 as described below in the direction perpendicular to the axial direction is preferably 0.1 to 3, and more preferably 0.5 to 2, although not particularly limited thereto. By controlling the cross-sectional area ratio to such a range, an increase in pressure loss during heat recovery can be suppressed.

A communication port 42 for guiding the first fluid flowing on the inner peripheral surface side of the guide member 40 to a space between the inner peripheral surface side of the second cylindrical member 30 and the outer peripheral surface side of the guide member 40 may be provided between the downstream end portion 41b and the second cylindrical member 30. Such communication port 42 can be provided by making the outer diameter of the downstream end portion 41b of the guide member 40 smaller than the inner diameter of the second cylindrical member 30.

When the communication port 42 as described above is provided, the downstream end portion 41b of the guide member 40 is located on the upstream end portion 31a side than the downstream end portion 31b of the second cylindrical member 30, in the axial direction of the guide member 40 and the second cylindrical member 30.

Figure 4:
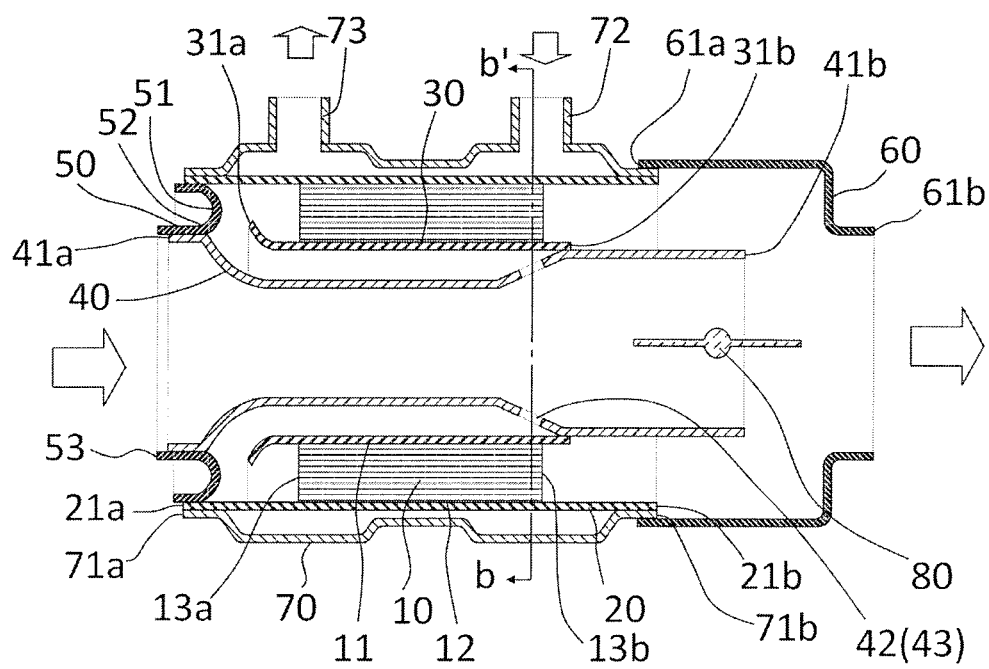
FIG. 4 is a cross-sectional view of another heat exchanger according to Embodiment 1 of the present invention, which is parallel to a flow direction of a first fluid.
Figure 5:
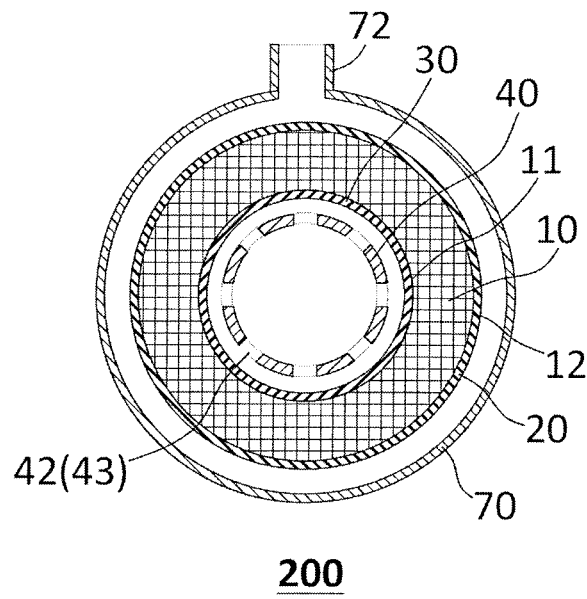
FIG. 5 is a cross-sectional view taken along the line b-b' in the heat exchanger of FIG. 4.

Alternatively, the communication port 42 may be provided in (the middle of) the guide member 40 as shown in FIGS. 4 and 5. Here, FIG. 4 is a cross-sectional view of the other heat exchanger 200 according to an embodiment of the present invention, which is parallel to the flow direction of the first fluid. Further, FIG. 5 is a cross-sectional view taken along the line b-b' of the heat exchanger 200 of FIG. 4.

The communication port 42 as described above can be provided by forming through holes 43 in (the middle of) the guide member 40, which penetrate the guide member 40 in the radial direction of the guide member 40. The through holes 43 are preferably provided in the entire circumferential direction of the guide member 40.

When the communication port 42 as described above is provided, in the axial direction of the guide member 40 and the second cylindrical member 30, the downstream end portion 41b of the guide member 40 may be located on the upstream end portion 31a side than the downstream end portion 31b of the second cylindrical member 30, or may extend on a more downstream side than the downstream end portion 31b. Further, the downstream end portion 31b of the second cylindrical member 30 may be connected to the guide member 40.

In the axial direction of the second cylindrical member 30, the communication port 42 is located on the downstream end portion 31b side than the upstream end portion 31a. By providing the communication port 42 at such a position, the flow direction of the first fluid toward the pillar shaped honeycomb structure 10 will be opposite to the flow direction of the first fluid on the inner peripheral surface side of the guide member 40. Therefore, during the suppression of heat recovery, it will be difficult for the first fluid to flow in a space between the second cylindrical member 30 and the guide member 40, thereby enabling the heat insulation performance to be improved.

The communication port 42 may extend beyond the second end face 13b of the pillar shaped honeycomb structure 10 in the axial direction of the pillar shaped honeycomb structure 10. By providing the communication port 42 at such a position, the flow path for the first fluid, which is opposite to the flow direction of the first fluid on the inner peripheral surface side of the guide member 40, will be longer. Therefore, the effect of improving the insulation performance can be further improved.

The guide member 40 preferably has an enlarged diameter portion whose diameter is increased to be substantially the same as the horn shape of the second cylindrical member 30. The enlarged diameter portion is formed around the upstream end portion 41a. Such a structure can provide the substantially the same width of the flow path for the first fluid formed between the second cylindrical member 30 and the guide member 40, and can provide smooth flowing of the first fluid passing between the second cylindrical member 30 and the guide member 40 and entering the pillar shaped honeycomb structure 10 during heat recovery, so that pressure loss can be reduced. Furthermore, the flow of the first fluid is easily brought into contact with the inner peripheral surface of the second cylindrical member 30 that is in contact with a flow path for the second fluid, so that the heat recovery performance can also be improved.

A method of fixing the guide member 40 is not particularly limited, and the guide member 40 may be fixed to an upstream cylindrical member 50 described below or the like. Th fixing method is not particularly limited, and it may be the same as that of the first cylindrical member 20 as described above.

A material of the guide member 40 is not particularly limited, and may be the same as that of the first cylindrical member 20 as described above.

A thickness of the guide member 40 is not particularly limited, and may be the same as that of the first cylindrical member 20 as described above.

<Upstream Cylindrical Member 50>

The upstream cylindrical member 50 is a cylindrical member that connects the upstream end portion 21a of the first cylindrical member 20 to the upstream side of the guide member 40.

It is preferable that an axial direction of the upstream cylindrical member 50 coincides with that of the pillar shaped honeycomb structure 10, and a central axis of the upstream cylindrical member 50 coincides with that of the pillar shaped honeycomb structure 10.

The upstream cylindrical member 50 preferably has a flange portion 51. The flange portion is provided with a rising position 52 on a downstream side of the upstream end portion 21a of the first cylindrical member 20. Such a structure can allow the first fluid flowing from a space between the second cylindrical member 30 and the guide member 40 to a space between the second cylindrical member 30 and the first cylindrical member 20 to be easily brought into contact with the inner peripheral surface of the first cylindrical member 20 that is in contact with the flow passage of the second flow path, so that the heat recovery efficiency can be improved. Further, it can provide smooth flowing of the first fluid entering the pillar shaped honeycomb structure 10, so that pressure loss can be reduced.

A shape of the flange portion 51 of the upstream cylindrical member 50 is not particularly limited, but it preferably has a curved surface structure. Such a structure can provide smooth flowing of the first fluid entering the pillar shaped honeycomb structure 10, so that the pressure loss can be further reduced.

When the flange portion 51 has the curved surface structure, it is preferably configured so as to form a continuous curved surface with the enlarged diameter portion of the guide member 40. Such a structure can provide smooth flowing of the first fluid entering the pillar shaped honeycomb structure 10, so that the pressure loss can be further reduced.

A material of the upstream cylindrical member 50 is not particularly limited, and may be the same as that of the first cylindrical member 20 as described above.

A thickness of the upstream cylindrical member 50 is not particularly limited, and may be the same as that of the first cylindrical member 20 as described above.

<Downstream Cylindrical Member 60>

The downstream cylindrical member 60 is connected to the downstream end portion 21b of the first cylindrical member 20. The connection may be direct or indirect. In the case of indirect connection, for example, a downstream end portion 71b of an outer cylindrical member 70 which will be described later, or the like, may be arranged between the downstream cylindrical member 60 and the downstream end portion 21b of the first cylindrical member 20.

The downstream cylindrical member 60 is a cylindrical member having an upstream end portion 61a and a downstream end portion 61b.

It is preferable that an axial direction of the downstream cylindrical member 60 coincides with that of the pillar shaped honeycomb structure 10, and a central axis of the downstream cylindrical member 60 coincides with that of the pillar shaped honeycomb structure 10.

Diameters (outer diameter and inner diameter) of the downstream cylindrical member 60 may be uniform in the axial direction, but at least a part of the diameters may be decreased or increased.

A material of the downstream cylindrical member 60 is not particularly limited and may be the same as that of the first cylindrical member 20 as described above.

A thickness of the downstream cylindrical member 60 is not particularly limited, and may be the same as that of the first cylindrical member 20 as described above.

<Outer Cylindrical Member 70>

The outer cylindrical member 70 is arranged on a radially outer side of the first cylindrical member 20 with a distance so as to form a flow path for a second fluid.

The outer cylindrical member 70 is a cylindrical member having an upstream end portion 71a and a downstream end portion 71b.

It is preferable that an axial direction of the outer cylinder member 70 coincides with that of the pillar shaped honeycomb structure 10, and a central axis of the outer cylinder member 70 coincides with that of the pillar shaped honeycomb structure 10.

The upstream end portion 71a of the outer cylindrical member 70 preferably extends beyond the first end surface 13a of the pillar shaped honeycomb structure 10 to the upstream side. Such a structure can allow a heat recovery efficiency to be improved.

Also, in this case, it is preferable that the end of the flange portion 51 of the upstream cylindrical member 50 extends to the vicinity of the upstream end portion 71a of the outer cylindrical member 70 that extends on the upstream side. Such a structure can provide smooth flowing of the first fluid entering the pillar shaped honeycomb structure 10, so that the pressure loss can be further reduced.

The outer cylindrical member 70 is preferably connected to both a feed pipe 72 for feeding the second fluid to a region between the outer cylindrical member 70 and the first cylindrical member 20, and a discharge pipe 73 for discharging the second fluid from a region between the outer cylindrical member 70 and the first cylindrical member 20. The feed pipe 72 and the discharge pipe 73 are preferably provided at positions corresponding to both axial ends of the pillar shaped honeycomb structure 10, respectively.

The feed pipe 72 and the discharge pipe 73 may extend in the same direction, or may extend in different directions.

The outer cylindrical member 70 is preferably arranged such that inner peripheral surfaces of the upstream end portion 71a and the downstream end portion 71b are in direct or indirect contact with the outer peripheral surface of the first cylindrical member 20.

A method of fixing the inner peripheral surfaces of the upstream end portion 71a and the downstream end portion 71b to the outer peripheral surface of the first cylindrical member 20 that can be used includes, but not limited to, fitting such as clearance fitting, interference fitting and shrinkage fitting, as well as brazing, welding, diffusion bonding, and the like.

Diameters (outer diameter and inner diameter) of the outer cylindrical member 70 may be uniform in the axial direction, but the diameter of at least a part (for example, a central portion in the axial direction, both ends in the axial direction, or the like) of the outer cylindrical member 70 may be decreased or increased. For example, by decreasing the diameter of the central portion in the axial direction of the outer cylindrical member 70, the second fluid can spread throughout the outer peripheral direction of the first cylindrical member 20 in the outer cylindrical member 70 on the feed pipe 72 and discharge pipe 73 sides. Therefore, an amount of the second fluid that does not contribute to the heat exchange at the central portion in the axial direction is reduced, so that the heat exchange efficiency can be improved.

A material of the outer cylindrical member 70 is not particularly limited, and may be the same as that of the first cylindrical member 20 as described above.

A thickness of the outer cylindrical member 70 is not particularly limited and may be the same as that of the first cylindrical member 20 as described above.

<On-Off Valve 80>

An on-off valve 80 is arranged on the downstream end portion 31b of the second cylindrical member 30 or the downstream end portion 41b of the guide member 40.

The on-off valve 80 is configured to be able to adjust the flow of the first fluid inside the second cylindrical member 30 and/or the guide member 40 during heat exchange (during heat recovery). Further, the on-off valve 80 is configured to be able to release the flow of the first fluid on the inner peripheral surface side of the second cylindrical member 30 and/or the guide member 40 during non-heat exchange (during suppression of heat recovery). That is, the on-off valve 80 can allow the first fluid to flow through the pillar shaped honeycomb structure 10 by closing the on-off valve 80 during the heat recovery, and can suppress the flow of the first fluid through the pillar shaped honeycomb structure 10 by opening the on-off valve 80, thereby allowing the first fluid to flow through the downstream cylindrical member 60 via the second cylindrical member 30 or the guide member 40.

The shape and structure of the on-off valve 80 are not particularly limited, and they may be selected depending on the shape of the second cylindrical member 30 or the guide member 40 in which the on-off valve 50 is provided, and the like.

<First Fluid and Second Fluid>

The first fluid and the second fluid used in the heat exchanger 100 are not particularly limited, and various liquids and gases can be used. For example, when the heat exchanger 100 is mounted on a motor vehicle, an exhaust gas can be used as the first fluid, and water or antifreeze (LLC defined by JIS K2234: 2006) can be used as the second fluid. Further, the first fluid can be a fluid having a temperature higher than that of the second fluid.

<Method for Producing Heat Exchanger 100>

The heat exchanger 100 can be produced in accordance with a known method. For example, the heat exchanger 100 can be produced in accordance with the method as described below.

First, a green body containing ceramic powder is extruded into a desired shape to prepare a honeycomb formed body. At this time, the shape and density of the cells 14, and lengths and thicknesses of the partition wall 15, the inner peripheral wall 11 and the outer peripheral wall 12, and the like, can be controlled by selecting dies and jigs in appropriate forms. The material of the honeycomb formed body that can be used includes the ceramics as described above. For example, when producing a honeycomb formed body containing the Si-impregnated SiC composite as a main component, a binder and water or an organic solvent are added to a predetermined amount of SiC powder, and the resulting mixture is kneaded to form a green body, which can be then formed into a honeycomb formed body having a desired shape. The resulting honeycomb formed body can be then dried, and the honeycomb formed body can be impregnated with metallic Si and fired under reduced pressure in an inert gas or vacuum to obtain a hollow pillar shaped honeycomb structure 10 having cells 14 defined by partition wall 15.

The hollow pillar shaped honeycomb structure 10 is then inserted into the first cylindrical member 20, and the first cylindrical member 20 is fitted to the surface of the outer peripheral wall 12 of the hollow pillar shaped honeycomb structure 10. Subsequently, the second cylindrical member 30 is inserted into the hollow region of the hollow pillar shaped honeycomb structure 10 and the second cylindrical member 30 is fitted to the surface of the inner peripheral wall 11 of the hollow pillar shaped honeycomb structure 10. The outer cylindrical member 70 is then arranged on and fixed to the radially outer side of the first cylindrical member 20. The feed pipe 72 and the discharge pipe 73 may be previously fixed to the outer cylindrical member 70, but they may be fixed to the outer cylindrical member 70 at an appropriate stage. Next, the guide member 40 is arranged on the radially inner side of the second cylindrical member 30, and the upstream end portion 21a of the first cylindrical member 20 and the upstream side of the guide member 40 is connected to each other by the upstream cylindrical member 50. The on-off valve 80 is then attached to the downstream end portion 31b of the second cylindrical member 30 or the downstream end portion 41b of the guide member 40. The downstream cylindrical member 60 is then disposed at the downstream end portion 21b of the first cylindrical member 20.

Further, the arranging and fixing (fitting) orders of the respective members are not limited to the above orders, and they may be changed as needed within a range in which the members can be produced. As the fixing (fitting) method, the above method may be used.

The heat exchanger 100 according to Embodiment 1 of the present invention can provide smooth flowing of the first fluid passing through the space between the second cylindrical member 30 and the guide member 40 and entering the pillar shaped honeycomb structure 10 during heat recovery, thereby enabling vortex flow to be suppressed. Therefore, the heat exchanger 100 can suppress an increase in pressure loss during heat recovery and improve the heat recovery performance.

Embodiment 2

A heat exchanger according to Embodiment 2 of the present invention includes: a hollow pillar shaped honeycomb structure; a first cylindrical member; a second cylindrical member; a guide member, an upstream cylindrical member; and a flow-regulating guide member. The heat exchanger may further include at least one of a downstream cylindrical member, an outer cylindrical member, and an on-off valve.

Figure 6:
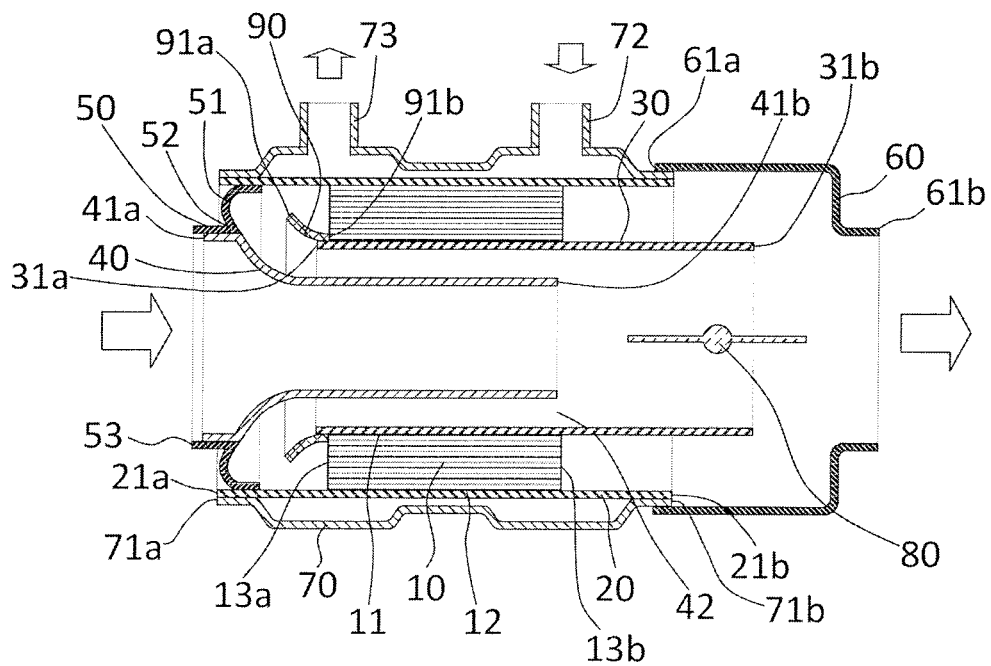
FIG. 6 is a cross-sectional view of a heat exchanger according to Embodiment 2 of the present invention, which is parallel to a flow direction of a first fluid.

FIG. 6 is a cross-sectional view of the heat exchanger according to Embodiment 2 of the present invention, which is parallel to a flow direction of a first fluid. The elements having the same reference numerals as those used in the descriptions of the heat exchanger 100 according to Embodiment 1 of the present invention are the same as those of a heat exchanger 300 according to Embodiment 2 of the present invention.

As shown in FIG. 6, the heat exchanger 300 according to Embodiment 2 of the present invention includes a hollow pillar shaped honeycomb structure 10; a first cylindrical member 20; a cylindrical member 30; a guide member 40; an upstream cylindrical member 50; a flow-regulating guide member 90; a downstream cylindrical member 60; an outer cylindrical member 70; and an on-off valve 80.

The heat exchanger 300 according to Embodiment 2 of the present invention is different from the heat exchanger 100 according to Embodiment 1 of the present invention in the shape of the second cylindrical member 30 and in that the heat exchanger 200 further includes the flow-regulating guide member 90.

In the heat exchanger 300 according to Embodiment 2 of the present invention, the second cylindrical member 30 does not have a horn shape in which the upstream end portion 31a is increased radially outward. Alternatively, the flow-regulating guide member 90 is connected to the upstream end portion 31a of the second cylindrical member 30.

The flow-regulating guide member 90 is a cylindrical member having an upstream end portion 91a and a downstream end portion 91b.

It is preferable that an axial direction of the flow-regulating guide member 90 coincides with that of the pillar shaped honeycomb structure 10, and the central axis of the flow-regulating guide member 90 coincides with that of the pillar shaped honeycomb structure 10.

The flow-regulating guide member 90 has a horn shape in which the upstream end portion 91a is increased radially outward. The flow-regulating guide member 90 having the horn shape brings about the same effect as that of the second cylindrical member 30 having the horn shape in the heat exchanger 100 according to Embodiment 1 of the present invention. That is, the flow-regulating guide member 90 having the horn shape can provide smooth flowing of the first fluid passing between the second cylindrical member 30, the flow-regulating guide member 90, and the guide member 40 and entering the pillar shaped honeycomb structure 10 during heat recovery to suppress the vortex flow, so that the pressure loss can be reduced.

For the flow-regulating guide member 90, the inner peripheral surface of the downstream end portion 91b may be in contact with the outer peripheral surface of the upstream end portion 31a of the second cylindrical member 30 or the outer peripheral surface of the downstream end portion 91b may be in contact with the inner peripheral surface of the upstream end portion 31a of the second cylindrical member 30. However, it is preferable that the inner peripheral surface of the downstream end portion 91b is in contact with the outer peripheral surface of the upstream end portion 31a of the second cylindrical member 30.

Here, the flow-regulating guide member 90 and the second cylindrical member 30 may be in direct contact with each other, or may be in indirect contact with each other via another member.

The inner peripheral surface of the downstream end portion 91b of the flow-regulating guide member 90 and the outer peripheral surface of the upstream end portion 31a of the second cylindrical member 30, or the outer peripheral surface of the downstream end portion 91b of the flow-regulating guide member 90 and the inner surface of the upstream end portion 31a of the second cylindrical members 30 are fixed in a state where they are fitted to each other. A fixing method is not particularly limited and may be the same as the fixing method of the first cylindrical member 20 as stated above.

A material of the flow-regulating guide member 90 is not particularly limited, and may be the same as that of the first cylindrical member 20 as described above.

A thickness of the flow-regulating guide member 90 is not particularly limited and may be the same as that of the first cylindrical member 20 as described above.

The heat exchanger 300 according to Embodiment 2 of the present invention can provide the same actions and effects as those of the heat exchanger 100 according to Embodiment 1 of the present invention. That is, the heat exchanger 300 according to Embodiment 2 of the present invention can provide smooth flowing of the first fluid passing through the second cylindrical member 30, the flow-regulating guide member 90 and the guide member 40 and entering the pillar shaped honeycomb structure 10 during heat recovery to suppress the vortex flow, so that the increase in pressure loss during heat recovery can be suppressed and the heat recovery performance can be improved.

EXAMPLES

Hereinafter, the present invention will be more specifically described with reference to Examples, but the present invention is not limited to these Examples.

<Production of Hollow Pillar Shaped Honeycomb Structure>

A green body containing SiC powder was extrusion-molded into a desired shape, and then dried, processed to have predetermined external dimensions, and impregnated with Si and fired to produce a hollow pillar shaped honeycomb structure. The hollow pillar shaped honeycomb structure was set to the following dimensions: an outer diameter of 75 mm, a diameter of the hollow region of 57 mm, a length in the flow path direction of the first fluid of 33 mm, a thickness of a partition wall of 0.3 mm, a thickness of the inner peripheral wall of 1.5 mm, and a thickness of the outer peripheral wall of 1.5 mm. The hollow pillar shaped honeycomb structure had settings: a porosity of 1% for the partition wall, the inner peripheral wall and the outer peripheral wall, a cell density of 300 cells/cm$^2$, an isostatic strength of 150 MPa, and a thermal conductivity at 25° C. of 150 W/(m·K).

<Production of Heat Exchanger>

Example 1

Figure 7:
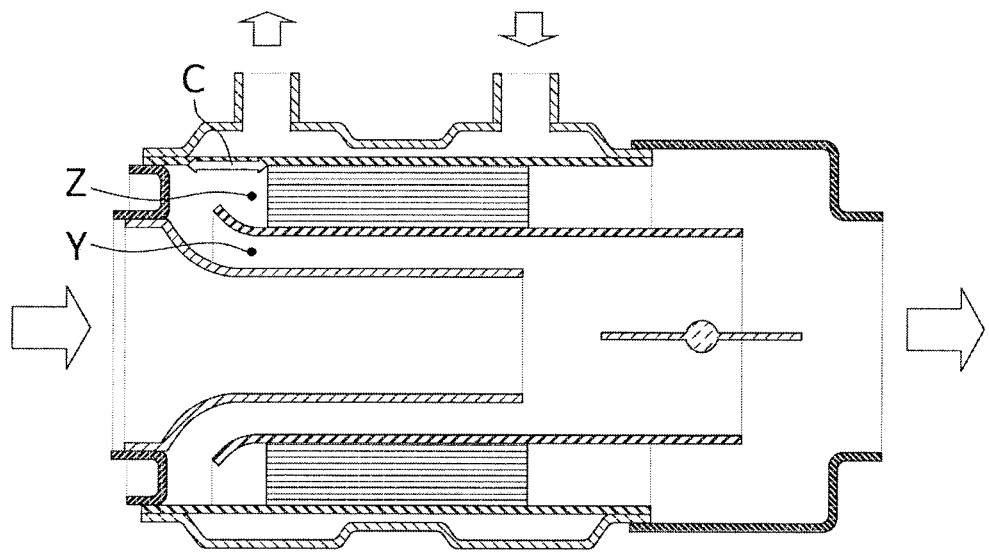
FIG. 7 is a cross-sectional view of a heat exchanger produced in Example 1, which is parallel to a flow direction of a first fluid.

Using the hollow pillar shaped honeycomb structure produced as described above, a heat exchanger 400 having the structure as shown in FIG. 7 was produced by the method as described above. The respective members of the heat exchanger 400 were made of stainless steel, and their thicknesses were from 1 to 1.5 mm. Further, the ratio of the cross-sectional area between the second cylindrical member 30 and the guide member 40 to the cross-sectional area at the upstream end portion 53 in the direction perpendicular to the axial direction of the upstream cylindrical member 50 was 0.3.

Comparative Example 1

Figure 8:
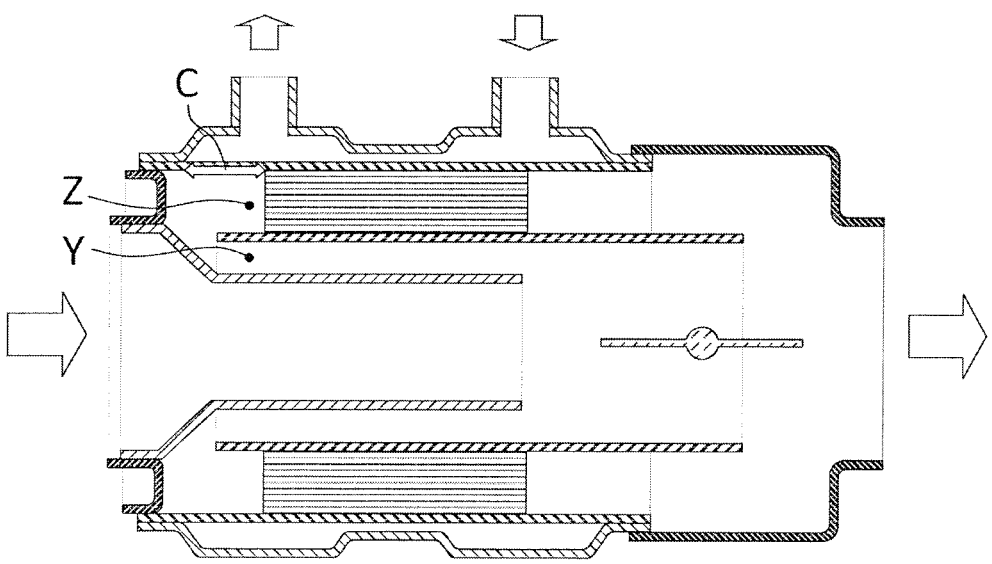
FIG. 8 is a cross-sectional view of a heat exchanger produced in Comparative Example 1, which is parallel to a flow direction of a first fluid.

Using the hollow pillar shaped honeycomb structure produced as described above, a heat exchanger 500 having the structure as shown in FIG. 8 (which had the same structure as that of the heat exchanger 400 according to Example 1, with the exception that it did not have a horn shape in which the diameter of the upstream end portion 31a of the second cylindrical member 30 was increased radially outward, and the guide member 40 did not have the portion whose diameter was increased to substantially the same as the horn shape of the second cylindrical member 30) was produced according to the method as described above.

For each of the heat exchangers 400, 500 produced in the above Example 1 and Comparative Example 1, a pressure loss and an amount of recovered heat during heat recovery were evaluated. The pressure loss and the amount of recovered heat were evaluated as follows.

(Pressure Loss)

A heat exchange test was conducted by feeding air (first fluid) at 400° C. (Tg1) was fed to each of the heat exchangers 400, 500 produced in the above Examples and Comparative Examples at a flow rate of 20 g/sec (Mg) while closing the on-off valve 80, and also feeding water (the second fluid) from the feed pipe 72 at a flow rate of 166 g/sec (Mw) and recovering water from the discharge pipe 73. In the heat exchange test, pressure gauges were placed at the Y and Z positions as shown in FIGS. 7 and 8 to measure the pressures. The pressure loss was calculated based on the following equation:

$$\text{Pressure loss} = P_y - P_z$$

In which Py is a pressure at the Y position, and Pz is a pressure at the Z position.

(Amount of Recovered Heat)

In the heat exchange test of the heat recovery efficiency as described above, the amount of recovered heat at the position C as shown in FIGS. 7 and 8 was evaluated. The amount of recovered heat was calculated based on the following equation:

$$\text{Amount of Recovered Heat at Position } C = A_c \cdot k \cdot dT/dx$$

In which Ac is a surface area (an inner peripheral surface area) of the first cylindrical member 20 at the position C, k is a thermal conductivity of the first fluid, and dT/dx is a temperature gradient at the position C (a rate of change of a temperature of the first cylindrical member 20 to the inner diameter direction x). The dT/dx was determined by dividing a difference (dT) between a temperature of the first cylindrical member 20 and a temperature of the first fluid at the portion that was in contact with the first cylindrical member 20 by a distance between the respective measurement points.

Table 1 shows the above evaluation results.

TABLE 1

|  | Example 1 | Comparative Example 1 |
| --- | --- | --- |
| Pressure Loss (Pa) | 50 | 120 |
| Amount of Recovered Heat (W) | 250 | 230 |

As shown in Table 1, the heat exchanger 400 according to Example 1 had a smaller pressure loss during of heat recovery and a higher amount of recovered heat than those of the heat exchanger 500 according to Comparative Example 1.

As can be seen from the above results, according to the present invention, it is possible to provide a heat exchanger capable of improving heat recovery performance without affecting pressure loss during heat recovery.

DESCRIPTION OF REFERENCE NUMERALS 10 pillar shaped honeycomb structure
11 inner peripheral wall
12 outer peripheral wall
13a first end face
13b second end face
14 cell
15 partition wall
20 first cylindrical member
21a upstream end portion
21b downstream end portion
30 second cylindrical member
31a upstream end portion
31b downstream end portion
40 guide member
41a upstream end portion
41b downstream end portion
42 communication port
43 through hole
50 upstream cylindrical member
51 flange portion
52 rising portion
53 upstream end portion
60 downstream cylindrical material
61a upstream end portion
61b downstream end portion
70 outer cylindrical member
71a upstream end portion
71b downstream end portion
72 feed pipe
73 discharge pipe
80 on-off valve
90 flow-regulating guide member
91a upstream end portion
91b downstream end portion
100, 200, 300 heat exchanger

The invention claimed is:

1. A heat exchanger, comprising:
a hollow pillar shaped honeycomb structure having an inner peripheral wall, an outer peripheral wall and a partition wall disposed between the inner peripheral wall and the outer peripheral wall, the partition wall defining a plurality of cells, each of the cells extending from a first end face to a second end face to form a flow path for a first fluid;
a first cylindrical member fitted to the outer peripheral wall of the pillar shaped honeycomb structure;
a second cylindrical member fitted to the inner peripheral wall of the pillar shaped honeycomb structure;
a cylindrical guide member having a portion arranged on a radially inner side of the second cylindrical member with a distance so as to form a flow path for the first fluid; and
an upstream cylindrical member connecting an upstream end portion of the first cylindrical member to an upstream side of the guide member,
wherein a communication port for guiding the first fluid flowing on an inner peripheral surface side of the guide member to a space between an inner peripheral surface side of the second cylindrical member and an outer peripheral surface side of the guide member is provided between the downstream end portion of the guide member and the second cylindrical member or at the guide member, wherein the second cylindrical member has a horn shape in which a diameter of the upstream end portion of the second cylindrical member is increased radially outward, and wherein the upstream cylindrical member has a flange portion, and an outwardly radially extending portion of the flange portion is located on a more downstream side than the upstream end portion of the first cylindrical member.

2. The heat exchanger according to claim 1, further comprising a downstream cylindrical member connected to a downstream end portion of the first cylindrical member.

3. The heat exchanger according to claim 1, wherein the flange portion of the upstream cylindrical member has a curved surface structure.

4. The heat exchanger according to claim 1, further comprising an outer cylindrical member arranged on a radially outer side of the first cylindrical member with a distance so as to form a flow path for a second fluid.

5. The heat exchanger according to claim 4, wherein an upstream end portion of the outer cylinder member extends beyond the first end face of the pillar shaped honeycomb structure toward the upstream side.

6. The heat exchanger according to claim 1, further comprising an on-off valve arranged on the downstream end portion of the second cylindrical member or the guide member.

7. The heat exchanger according to claim 6, wherein the on-off valve is configured to be able to adjust the flow of the first fluid inside the second cylindrical member and/or the guide member during heat exchange.

8. The heat exchanger according to claim 1, wherein the guide member has an enlarged diameter portion whose diameter is increased to be substantially the same as the horn shape of the second cylindrical member.

9. The heat exchanger according to claim 8, wherein it is configured such that the curved surface structure of the flange portion of the upstream cylindrical member and the enlarged diameter portion of the guide member form a continuous curved surface.

10. The heat exchanger according to claim 5, wherein an end portion of the flange portion of the upstream cylindrical member extends to the vicinity of the upstream end portion of the outer cylindrical member, which extends on an upstream side.

11. A heat exchanger, comprising:
a hollow pillar shaped honeycomb structure having an inner peripheral wall, an outer peripheral wall and a partition wall disposed between the inner peripheral wall and the outer peripheral wall, the partition wall defining a plurality of cells, each of the cells extending from a first end face to a second end face to form a flow path for a first fluid;
a first cylindrical member fitted to the outer peripheral wall of the pillar shaped honeycomb structure;
a second cylindrical member fitted to the inner peripheral wall of the pillar shaped honeycomb structure;
a cylindrical guide member having a portion arranged on a radially inner side of the second cylindrical member with a distance so as to form a flow path for the first fluid;
an upstream cylindrical member connecting an upstream end portion of the first cylindrical member to an upstream side of the guide member; and
a cylindrical flow-regulating guide member connected to the upstream end portion of the second cylindrical member, wherein a communication port for guiding the first fluid flowing on an inner peripheral surface side of the guide member to a space between an inner peripheral surface side of the second cylindrical member and an outer peripheral surface side of the guide member is provided between the downstream end portion of the guide member and the second cylindrical member or at the guide member, wherein the upstream cylindrical member has a flange portion, and an outwardly radially extending portion of the flange portion is located on a more downstream side than the upstream end portion of the first cylindrical member, and wherein the cylindrical flow-regulating guide member has a horn shape in which a diameter of an upstream end portion of the flow-regulating guide member is increased radially outward.

12. The heat exchanger according to claim 11, further comprising a downstream cylindrical member connected to a downstream end portion of the first cylindrical member.

13. The heat exchanger according to claim 11, wherein the flange portion of the upstream cylindrical member has a curved surface structure.

14. The heat exchanger according to claim 11, further comprising an outer cylindrical member arranged on a radially outer side of the first cylindrical member with a distance so as to form a flow path for a second fluid.

15. The heat exchanger according to claim 14, wherein an upstream end portion of the outer cylinder member extends beyond the first end face of the pillar shaped honeycomb structure toward the upstream side.

16. The heat exchanger according to claim 11, further comprising an on-off valve arranged on the downstream end portion of the second cylindrical member or the guide member.

17. The heat exchanger according to claim 16, wherein the on-off valve is configured to be able to adjust the flow of the first fluid inside the second cylindrical member and/or the guide member during heat exchange.

18. The heat exchanger according to claim 11, wherein the guide member has an enlarged diameter portion whose diameter is increased to be substantially the same as the horn shape of the flow-regulating guide member.

19. The heat exchanger according to claim 18, wherein it is configured such that the curved surface structure of the flange portion of the upstream cylindrical member and the enlarged diameter portion of the guide member form a continuous curved surface.

20. The heat exchanger according to claim 15, wherein an end portion of the flange portion of the upstream cylindrical member extends to the vicinity of the upstream end portion of the outer cylindrical member, which extends on an upstream side.

* * * * *